United States Patent [19]

Thompson et al.

[11] Patent Number: 5,277,257
[45] Date of Patent: Jan. 11, 1994

[54] DEPTH CONTROL MECHANISM FOR AN IMPLEMENT

[75] Inventors: Warren L. Thompson, Elkhart; Donald T. Sorlie, Ankeny, both of Iowa

[73] Assignee: Deere & Company, Moline, Ill.

[21] Appl. No.: 956,148

[22] Filed: Oct. 5, 1992

[51] Int. Cl.⁵ .................... A01B 63/111; A01B 63/22
[52] U.S. Cl. .................... 172/4; 172/413; 172/327; 172/414; 172/423; 172/493; 172/465; 172/668; 91/383
[58] Field of Search .................... 172/4, 327, 407, 413, 172/414, 422–425, 491–493, 465, 485, 668; 74/140; 192/138; 280/414.5; 91/358R, 368, 374, 375R, 365, 385

[56] References Cited

U.S. PATENT DOCUMENTS

| | | | |
|---|---|---|---|
| 2,526,058 | 10/1950 | Young | 172/493 |
| 2,573,969 | 11/1951 | Heitzig | 172/493 |
| 2,606,414 | 8/1952 | Durr | 172/413 |
| 2,606,532 | 8/1952 | Ziskal | 172/413 |
| 2,960,969 | 11/1960 | Hershman | 91/383 |
| 3,057,092 | 10/1962 | Curlett | 172/485 |
| 3,583,284 | 6/1971 | Ryan | 172/413 |
| 4,360,067 | 11/1982 | Schaaf et al. | 172/413 |
| 4,487,267 | 12/1984 | Friggstad | 172/414 |
| 4,932,476 | 6/1990 | Hoehm | |

OTHER PUBLICATIONS

John Deere Des Moines Works, 960 Series Drawn Field Cultivators Operator's Manual, 1992, pp. 10-5, 40-2 through 40-5.
John Deere Des Moines Works, 960 Series Drawn Field Cultivators Predelivery Instructions, 1991, pp. 15-19 and 15-22.

Primary Examiner—Randolph A. Reese
Assistant Examiner—Spencer Warnick

[57] ABSTRACT

A chain is connected at its distal end to the pin at the rod end of a cylinder on an implement lift and depth control assembly. An intermediate portion of the chain is trained around a gear which rotates about the axis of the pin connecting the base end of the cylinder to the implement frame. An adjustable length, spring-biased rod is connected to the proximal end of the chain to maintain tension in the chain and operate a single point depth control valve to establish a highly accurate and repeatable depth setting which is dependent directly on cylinder rod extension and therefore less susceptible to looseness in the implement lift system.

9 Claims, 3 Drawing Sheets

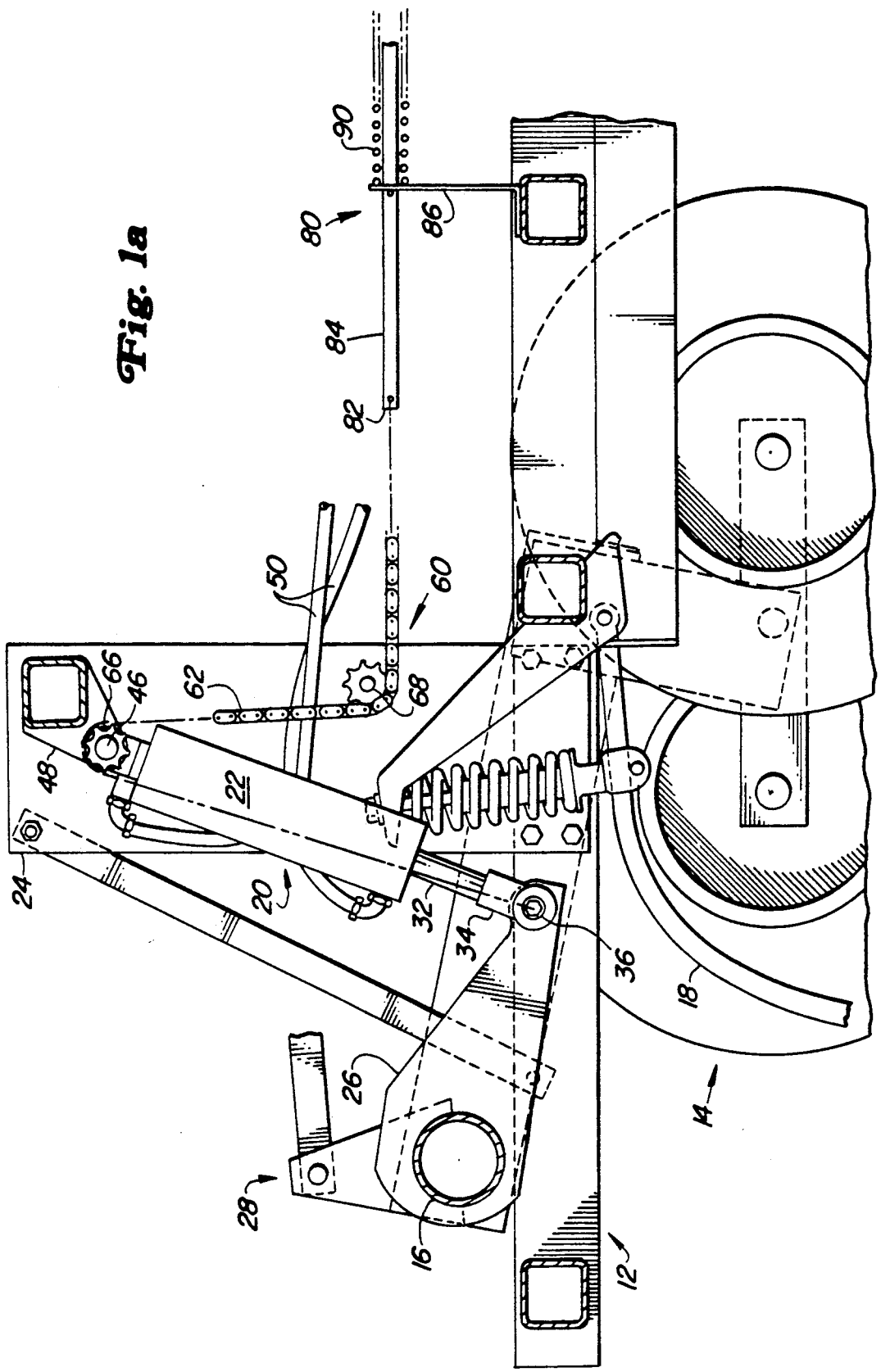

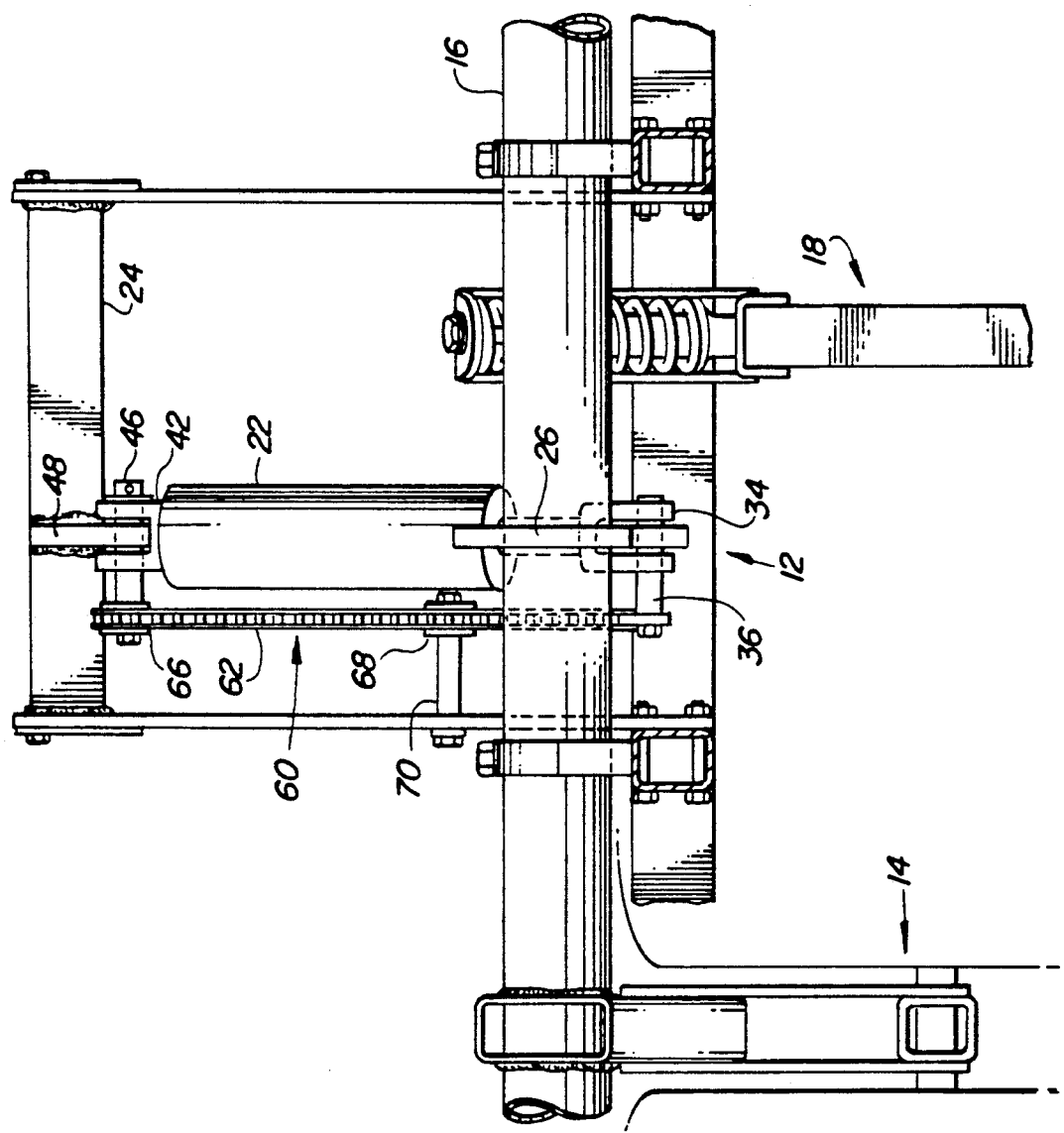

DEPTH CONTROL MECHANISM FOR AN IMPLEMENT

BACKGROUND OF THE INVENTION

1) Field of the Invention:

The present invention relates generally to agricultural implements such as field cultivators and chisel plows, and more specifically to structure for controlling the operating depth of such implements.

2) Related Art:

Single point depth control structures are widely used to control the working depth of an implement. A valve which controls the lift cylinders is actuated by a plunger mounted on a tube and bracket arrangement and controlled by rockshaft rotation. The movement of the plunger is highly susceptible to looseness in the various connections and joints. Unacceptable variations in implement working depth often result from inaccuracies and nonrepeatability introduced the looseness.

Other types devices are available to limit retraction of a cylinder to set working depth, including donut-shaped spacers placed over the cylinder rod or cylinder-mounted valves. However, most of these devices suffer from one or more disadvantages, such as inaccessibility and limited adjustment capability.

BRIEF SUMMARY OF THE INVENTION

It is therefore an object of the invention to provide an improved single point depth control arrangement which overcomes the aforementioned problems. It is another object to provide such an arrangement which is simple in construction and yet provides accurate and repeatable depth control regardless of looseness which may exist in the lift system.

It is a further object to provide an improved single point depth control system which is simple, inexpensive, and highly accurate and which is easily accessible for precisely adjusting implement height.

A length of chain is connected at one of its ends to the pin at the rod end of a cylinder on an implement depth control assembly. An intermediate portion of the chain is trained around a gear which rotates about the axis of the pin connecting the base end of the cylinder to the implement. An adjustable length spring-biased member, connected to and extending forwardly from the proximal end of the chain, operates an activator on a single point depth control valve to limit cylinder retraction. The system relies on a simple measurement of cylinder rod extension rather than rockshaft position and establishes a very accurate and repeatable depth setting which is less susceptible to looseness in the implement lift system than at least most previously available single point depth control arrangements.

These and other objects, features and advantages of the present invention will become apparent to one skilled in the art upon reading the following detailed description in view of the drawings.

BRIEF DESCRIPTION OF THE DRAWINGS

FIG. 1a is a side view of a rear portion of an implement with the depth control arrangement of the present invention attached.

FIG. 1b is a side view of the portion of the implement located forwardly of the portion shown in FIG. 1a.

FIG. 2 is front view of the lift assembly area of the implement shown in FIGS. 1a and 1b.

DETAILED DESCRIPTION OF THE DRAWINGS

Figure 1B:
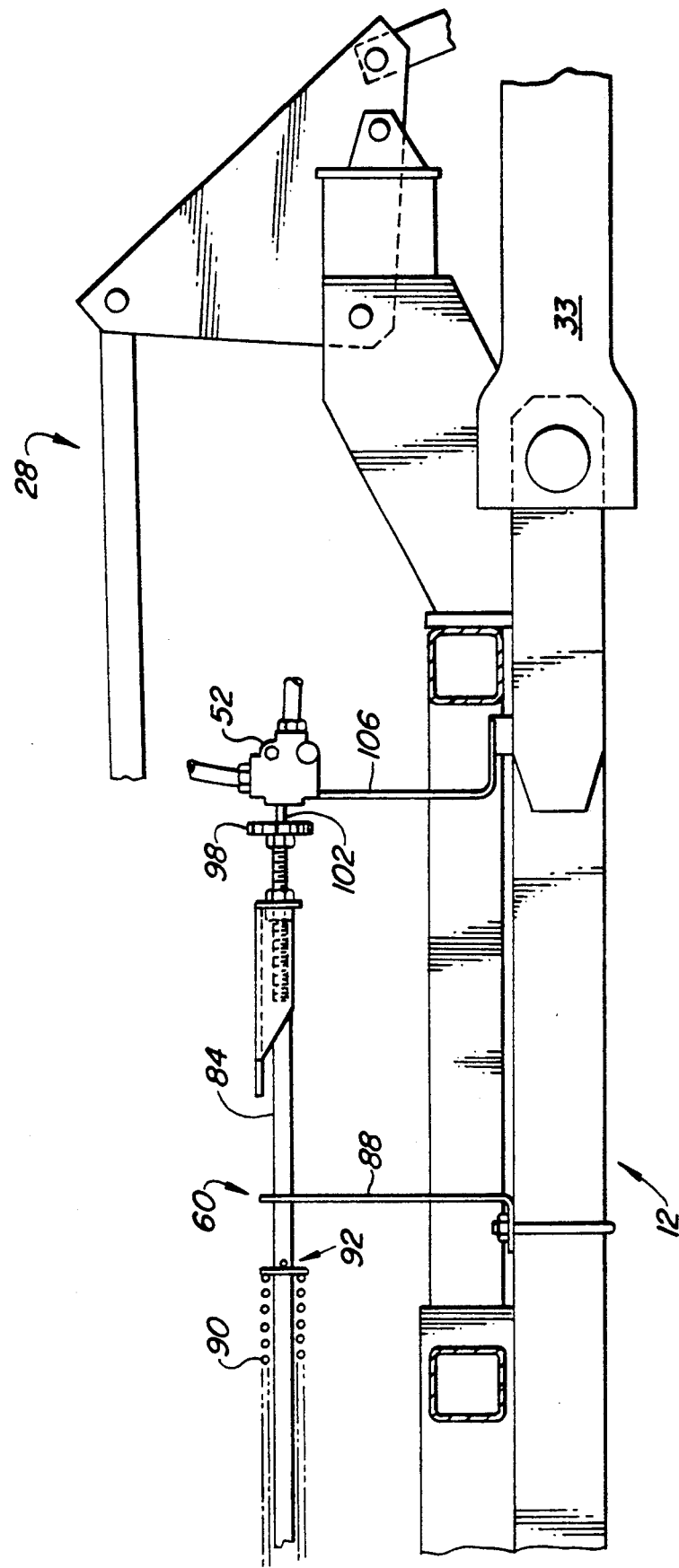

Referring now to FIGS. 1a and 1b, therein is shown a ground engaging implement 10 such as a field cultivator or chisel plow having a main frame 12 supported above the ground by vertically adjustable ground engaging wheel assemblies 14 connected to a rockshaft 16. The frame 12 carries a plurality of earthworking tool assemblies 18. A lift and depth control assembly 20 including a cylinder 22 connected between a mast 24 on the frame 12 and an arm 26 fixed to the rockshaft 16 rotates the rockshaft to raise and lower the frame between transport and field-working positions and to adjust the depth of penetration of the earthworking tools (not shown) on the assemblies 18 when the implement is in the field-working position. A level lift linkage indicated generally at 28 is connected between the rockshaft 16 and a forward hitch 33 pivotally connected to the frame 12 to help maintain the frame in a generally level position as the implement is raised and lowered.

The cylinder 22 includes a rod 32 having a rod end or clevis 34 connected by a transversely extending pin 36 to radially outermost portion of the arm 26. A base end 42 of the cylinder is connected by a second transversely extending pin 46 to a bracket 48 on the mast 24. Hydraulic lines 50 are connected to a source of hydraulic fluid on the towing vehicle (not shown) through a depth control valve 52 supported at the forward end of the frame 12. Extending the cylinder 22 by pressurizing the base end rotates the rockshaft 16 in a clockwise direction (FIG. 1a) and raises the frame 12. To lower the frame 12, the cylinder 22 is retracted by relieving the pressure at the base end. Depth control structure indicated generally at 60 is provided to limit cylinder retraction and automatically provide a preselected frame operating height directly dependent on cylinder rod extension.

The depth control structure 60 includes a flexible member 62 connected to the rod end of the cylinder 22. The member 62 extends alongside the cylinder 22 to an idler gear or pulley 66 connected to the end of the base-end pin 46 for rotation about the axis of the pin. The length of the member 62 between the rod end and the base end of the cylinder is directly proportional to the extension of the rod 32. The flexible member 62 extends downwardly from the gear 66 to a second idler gear or pulley 68 mounted on a shaft 70 which is connected to a side frame member of the mast 24 at a location just above the main frame 12. Preferably, the flexible member 62 is a roller chain having a distal end connected to the pin 36 at the rod end of the cylinder 22 and a proximal end connected to a spring-biased tube assembly 80 at location 82. The tube assembly 80 maintains the chain 62 under tension and is responsive to the length of the chain between the rod and base ends for operating the depth control valve 52 to control implement frame height directly as a function of cylinder rod extension.

The tube assembly 80 includes a generally horizontal rod or tube 84 having a distal end connected at the location 82 to the proximal end of the flexible member 62. The tube 84 is slidably supported above and generally parallel to the frame 12 by rear and front brackets 86 and 88. A coil spring 90 encircles the intermediate portion of the tube 84 and is compressed between the rear bracket 86 and a pin and washer 92 located between the brackets 86 and 88 to urge the tube forwardly in the brackets and maintain the flexible member 62 under tension. The proximal end of the tube 84 is conveniently located at an accessible location near the front of the frame 12 and includes a threaded valve operator 98 which can be rotated to change the effective length of the tube 84 and thus adjust working depth, as will be discussed in detail below.

The depth control valve 52 includes a depressible activator 102. The body of the valve 52 is supported by a bracket 106 with the activator 102 in the path which the operator 98 follows as the tube 84 moves forwardly upon retraction of the cylinder 22. As the cylinder 22 retracts to lower the frame 12 to the field-working position, the proximal end of the chain 62 will move forwardly with the tube 84 in direct proportion to the cylinder retraction. When the valve operator 98 contacts and depresses the activator 102 of the valve 52, the valve 52 will block flow from the base end of the cylinder 22 to prevent further lowering of the frame and maintain a given depth of penetration. To increase working depth, the operator simply rotates the valve operator 98 to decrease the effective length of the tube 84 so that the cylinder 22 will have to retract more before the activator 102 on the valve 52 is depressed. By rotating the valve operator the opposite direction, the effective length of the tube is increased so that the working depth of the implement is decreased.

Having described the preferred embodiment, it will become apparent that various modifications can be made without departing from the scope of the invention as defined in the accompanying claims.

We claim:

1. In a framed implement having a lift assembly for varying the height of the frame above the ground, the lift assembly including a cylinder with an extendible rod wherein the extension of the rod determines the operating height of the frame, a depth control comprising:
   a flexible member connected to the cylinder and movable in response to the extension of the rod;
   a valve connected to the cylinder and to a source of hydraulic fluid under pressure; and
   means operably connected to the flexible member for operating the valve in response to movement of the flexible member to automatically provide a preselected frame operating height directly dependent on cylinder rod extension, wherein the means for operating the valve includes an adjustable length member connected to the flexible member and the preselected frame operating height is a function of the adjusted length of the member.

2. The invention as set forth in claim 1 including a pulley member fixed relative to the cylinder, wherein the flexible member is connected to the cylinder for movement with the rod and is trained over the pulley member such that the length of a portion of the flexible member is proportional to the amount of rod extension.

3. In a framed implement having a lift assembly for varying the height of the frame above the ground, the lift assembly including a cylinder with an extendible rod wherein the extension of the rod determines the operating height of the frame, a depth control comprising:
   a flexible member connected to the cylinder and movable in response to the extension of the rod;
   a valve connected to the cylinder and to a source of hydraulic fluid under pressure; and
   means operably connected to the flexible member for operating the valve in response to movement of the flexible member to automatically provide a preselected frame operating height directly dependent on cylinder rod extension, wherein the flexible member includes a first end connected to the rod of the cylinder and an intermediate section trained over a pulley member connected to the other end of the cylinder.

4. The invention as set froth in claim 3 including two elongated pins connected respectively to the rod end and base end of the cylinder, and wherein the pulley member is connected to the base end pin for rotation about an axis generally corresponding to the axis of the pin.

5. The invention as set forth in claim 4 wherein the first end of the flexible member is connected to the rod end pin.

6. In a framed implement adapted for forward movement over the ground and having a lift assembly for varying the height of the frame above the ground, the lift assembly including a cylinder with a base end and an extendible rod with a rod end, wherein the extension of the rod determines the operating height of the frame, a depth control comprising:
   an operable control valve connected to the cylinder;
   a flexible member tensioned between the rod and base ends of the cylinder so that a length of the flexible member between the cylinder ends is dependent on the cylinder rod extension, wherein the flexible member comprises a chain having a first end connected to one end of the cylinder and trained around an idler connected to the other end of the cylinder; and
   means responsive to the length of the flexible member between the rod and base ends for operating the control valve to control implement height, wherein the means responsive to the length includes a valve operator connected to the flexible member.

7. The invention as set forth in claim 4 wherein the valve operator extends forwardly from the cylinder to the front of the implement frame, and means is located near the front of the implement frame for adjusting the valve operator to vary implement height.

8. The invention as set forth in claim 6 including means for biasing the valve operator towards the control valve and maintaining the flexible member under tension.

9. In an implement having a fore and aft extending frame and adapted for forward movement over the ground, the implement including a lift assembly for varying the height of the frame above the ground, the lift assembly including a cylinder with a base end and an extendible rod with a rod end. wherein the extension of the rod determines the operating height of the frame, a depth control comprising:
   a control valve supported at the forward end of the frame and connected to the cylinder;
   a pulley member supported adjacent the cylinder;
   a flexible member having a distal end connected to the rod end of the cylinder and trained around the pulley member, the flexible member having a forward portion extending forwardly from the pulley member;
   means located forwardly of the pulley member for maintaining tension on the flexible member while facilitating movement of the forward portion of the flexible member in the fore and aft direction as the cylinder rod retracts and extends; and
   means responsive to the fore and aft movement of the forward portion of the flexible member for operating the control valve to control implement height directly as a function of cylinder rod extension.

* * * * *